E. D. EKSTEDT.
NUTCRACKER.
APPLICATION FILED JUNE 29, 1914.
1,148,893.
Patented Aug. 3, 1915.
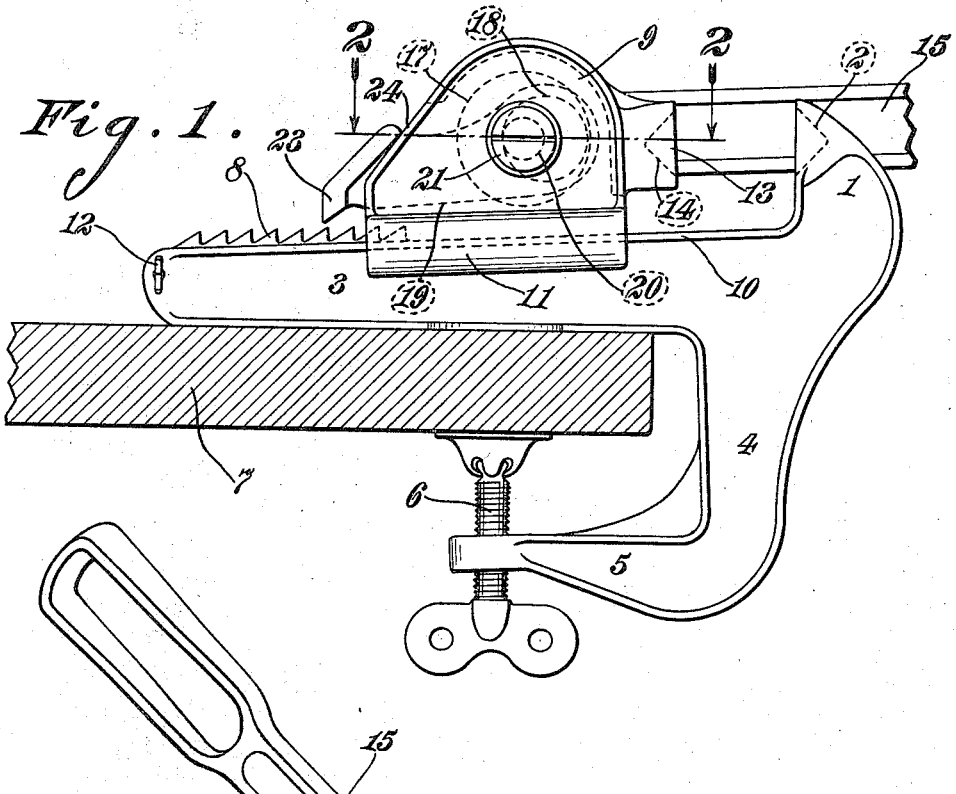
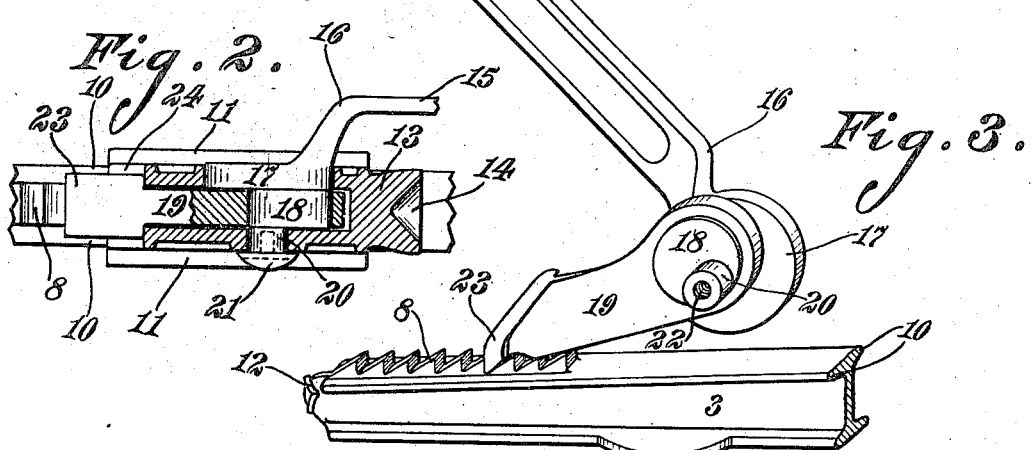
Witnesses:
Harry H. Reiss
George G. Anderson
Inventor:
ERNEST D. EKSTEDT,
By Hugh K. Wagner
His Attorney.

UNITED STATES PATENT OFFICE.

ERNEST D. EKSTEDT, OF EAST ST. LOUIS, ILLINOIS.

NUTCRACKER.

1,148,893.

Specification of Letters Patent.

Patented Aug. 3, 1915.

Application filed June 29, 1914. Serial No. 847,816.

*To all whom it may concern:*

Be it known that I, ERNEST D. EKSTEDT, a citizen of the United States, residing at the city of East St. Louis, in the county of St. Clair and State of Illinois, have invented certain new and useful Improvements in Nutcrackers, of which the following is a specification.

This invention relates to improvements in nut-crackers and refers particularly to that class of nut-crackers having a stationary jaw and a movable jaw between which two jaws an inserted nut may be cracked.

It has for its object to provide a cheap, strong, powerful, and easily operated device of its class simple of construction and composed of very few parts, and among other advantages, the device of this invention has the advantage that it is readily adjustable to the size of any nut, can be quickly operated upon succeeding nuts, exerts great power gradually applied, is very durable, and is not easily worked loose in operation from the support to which it may be fastened.

In the accompanying drawings, forming part of this specification, in which like numbers of reference denote like parts wherever they occur, Figure 1 is a side view of the nut cracker with part of the handle of the operating lever broken off; Fig. 2 is a sectional view from above on the line 2—2, Fig. 1; Fig. 3 is a diagrammatical view of the lever and associated parts with the housing thereof removed.

The base comprises preferably in one piece the upright stationary jaw-piece 1 which is provided with recess 2 or the like adapted to receive an end or the curvature of a nut to be cracked, a horizontal I-shaped track-member 3, of any desired length, a downward extending piece 4 from the lower portion of which extends horizontally substantially parallel with and in the same direction as the track-member 3 but of less length than said track-member, and an arm 5 the end of which arm 5 is provided with a screw device 6 or the like of any suitable construction serviceable as a means for fastening the base of the nut-cracker to a table 7 or other suitable support. Upon the upper surface of the I-shaped track-member 3, which upper surface is preferably slightly inclined upward toward the jaw-piece 1, beginning at or near the end of said track-member farthest from the stationary jaw-piece 1 there is provided, preferably as an integral part of said base, a rack 8 extending in length along the upper surface of said track-piece 3 for any desired distance toward the stationary jaw-piece 1, the teeth of said track having a substantially vertical face of each tooth turned toward the recess 2 of said stationary jaw-piece 1. A movable jaw-piece 9 is slidably supported upon the track-member 3 the flanges 10 or a pair of such flanges slidably supporting said movable jaw-piece 9 within a suitably shaped guiding groove or grooves so formed at the base of the jaw-piece 9 that said jaw-piece is adapted to slide longitudinal the track-member 3 but is prevented from being lifted off upwardly from said track-member by reason of a bulged portion 11 (including said guiding groove) on the jaw-piece 9 embracing the flanges 10 of the track-member 3. A cotter pin 12 or the like inserted through a suitable hole near the end of the track-member 3 is provided to prevent the jaw-piece 9 and its associated parts (hereinafter described) from sliding longitudinally off from the track-member 3 when the nut-cracker is in use. The jaw-piece 9 bearing the cylindrical extension 13 on the part of said jaw-piece 9 facing the recess 2 in the stationary jaw-piece 1 forms the movable jaw-piece of the nut-cracker of this invention, said cylindrical extension 13 being provided with a recess 14 opposite and similar to the recess 2, the said recesses 14 and 2 being adapted to receive opposite ends or opposite bulging portions of a nut placed between the said stationary and said movable jaw-pieces.

The movable jaw-piece 9 is operated by means of a lever 15 being preferably constructed with an inward curve 16 toward the adjacent side of the jaw-piece 9 and terminating in a hub 17 which hub 17 is revolubly seated in a circular opening in the side of the movable jaw-piece 9. Adjacent to said hub 17 is an eccentric 18 which eccentric pivotally supports the pawl 19. Adjacent to said eccentric 18 a reduced extension 20 of the hub 17 is provided, which is revolubly seated in a circular bearing located in the side of the movable jaw-piece 9 opposite that at which hub 17 is seated. The reduced hub-extension 20 terminates flush with the outside of the movable jaw-piece 9, and the lever 15 and its associated parts hereinabove described are held in place by means of a screw-head 21 or the like, the screw of which is screwed into the screw-hole 22 provided in the reduced hub-extension 20, the screw-head 21 being larger in circumference than the circumference of the hub-extension 20.

The pawl 19 bears a shoulder 23 or a pair of such shoulders so constructed that when by operation of the lever 15 the hub 17 and the hub-extension 20 are revolved within their respective bearings so that the eccentric 18 borne between said hub and said hub-extension is in the position illustrated in Fig. 1, the pawl 19 is pulled toward the recess 14 of the movable jaw-piece 9 by the eccentric 18, which pivotally supports said pawl 19, so that the shoulder 23 sliding upon an appropriately shaped incline 24 on the jaw-piece 9 or abutting upon some other suitable projection provided for that purpose, the pawl is lifted from engagement with the teeth of the rack 8 whereby the movable jaw-piece 9 is slidable freely forward and backward upon the track-member 3. When, however, by operating the lever 15, the hub 17, the hub-extension 20, the eccentric intermediate therebetween, and the associated parts are brought in the position shown in Fig. 3, the pawl 19 is permitted to engage the teeth of the rack, whereupon by further rocking the lever 15 counter-clockwise, the pawl coöperating on its pivotal bearing with the eccentric 18 the movable jaw-piece 9 is advanced up the incline of the track-member 3 toward the stationary jaw-piece 1. It will be observed that the movable jaw-piece 9 serves, also, as a housing for the eccentric 18 and its associate parts.

As best seen in Fig. 1, the track-member 3 is preferably so constructed that the rack-bearing surface adjacent to the flange 10 thereon inclines slightly from the stationary jaw-piece 1 to the end where the cotter-pin 12 is located, the highest point in said incline being at the junction of said track-member 3 with said stationary jaw-piece 1 and the lowest point in said incline being at the end where said cotter-pin 12 is located. This form of construction serves the purpose of strengthening the casting at the part constituting the stationary jaw-piece 1, which, in operation, is subject to great strain, and, also, serves the purpose of facilitating the movement of the movable jaw-piece 9 in sliding it away from the stationary jaw-piece 1 on the track-member 3 along the downward grade of the incline.

In operating the nut-cracker when fastened upon a support 7 as shown in Fig. 1, the lever 15 is pulled forward to the position shown in Fig. 1, the space between the stationary jaw-piece 1 and the movable jaw-piece 9 adjusted to the size of the nut to be cracked by sliding the movable jaw-piece 9 forward or backward upon the track-member 3, and, the nut having been inserted between the two jaw-pieces supported in the recesses 2 and 14, the handle of the lever 15 is swung upward and away from the stationary jaw-piece 1 causing the pawl 19 to engage a tooth of the rack 8 so that on continuing to push the lever in the direction away from the stationary jaw-piece 1, the movable jaw-piece 9 moves toward the stationary jaw-piece 1, whereby the nut is cracked. The cracked nut is then readily released by reversing the lever 15, whereupon another nut may quickly be inserted in position and cracked as hereinabove described.

Various changes in the details of construction and arrangement of parts may be made without departing from the nature and spirit of this invention.

I claim:

1. A nut cracker comprising a fixed nut seat member, a movable nut seat member having a cam face, an operating handle journaled on the said movable member, an impelling member loosely and eccentrically carried by said handle, and an abutment for the impelling member, whereby the movable seat member is moved to coöperate with the fixed seat member when the handle is moved in one direction, and the impelling member is lifted from engagement with its abutment by said cam face when the handle is moved in the opposite direction.

2. A nut cracker comprising a fixed and a movable nut seat member, a cam face carried by the movable seat member, an operating handle journaled on said movable member, an eccentric carried by said handle, an impelling member loosely journaled on said eccentric, and an abutment for said impelling member, whereby when the handle is moved in one direction the movable seat member is moved in the direction of the fixed member and when moved in the opposite direction the pawl is moved by said cam face out of engagement with the said abutment.

3. A nut cracker comprising a fixed nut seat member, a movable nut seat member having an inclined cam face, a loosely journaled pawl, an abutment for said pawl, and means when moved in one direction to move the pawl bodily to throw it into engagement with said abutment to impel the movable member and when moved in the opposite direction to move the pawl into engagement with said cam surface whereby it is moved out of engagement with the said abutment.

4. In a nut cracker, the combination with a base having a nut seat and a rack on said base, of a frame slidably mounted on said base and provided with a nut seat coöperating with the nut seat on the base, an inclined bearing face on said frame, an operating lever having a journal at one end journaled in said frame, a journal carried by said journal but eccentric therewith, a pawl loosely journaled on said eccentric journal, and a projection on the free end portion of said pawl constructed to coöperate with the inclined bearing face of the frame to raise the pawl out of engagement with the said rack.

5. In a nut cracker, the combination, with a base having a nut seat and a rack on said base, of a frame slidably mounted on said base and provided with a nut seat coöperating with the nut seat on the base, a plurality of journal bearings formed in said frame, an operating lever having a plurality of journals at one end concentric to each other and journaled in the said bearings in said frame, an eccentric carried by said handle, and a pawl loosely mounted on said eccentric and adapted to coöperate with the said rack to move the nut seats toward each other.

In testimony whereof I hereunto affix my signature in the presence of two witnesses.

ERNEST D. EKSTEDT.

Witnesses:
GEORGE G. ANDERSON,
WALTER C. GUELS.